United States Patent
Ferme et al.

[11] Patent Number: 6,152,684
[45] Date of Patent: Nov. 28, 2000

[54] METHOD FOR OPERATION OF HYDRAULIC TURBINE

[75] Inventors: Jean-Marc Ferme; Joachim Klein; Eberhard Kopf, all of Heidenheim, Germany

[73] Assignee: Voith Hydro, Inc., York, Pa.

[21] Appl. No.: 09/063,599

[22] Filed: Apr. 21, 1998

[30]  Foreign Application Priority Data

May 12, 1997 [DE] Germany .......................... 197 19 406

[51] Int. Cl.[7] .......................... F01D 17/00; F04D 31/00
[52] U.S. Cl. ................... 415/1; 415/13; 415/116
[58] Field of Search ................... 415/17, 24, 48, 415/1; 290/43

[56]  References Cited

U.S. PATENT DOCUMENTS

| | | | |
|---|---|---|---|
| 3,174,719 | 3/1965 | Sproule et al. | 415/110 |
| 3,188,050 | 6/1965 | Koeller | 415/117 |
| 3,236,499 | 2/1966 | Chatfield et al. | 415/26 |
| 3,405,913 | 10/1968 | Chatfield et al. | 415/174.5 |
| 3,677,659 | 7/1972 | Williams | 415/111 |
| 4,003,671 | 1/1977 | Huse et al. | 415/1 |
| 4,014,624 | 3/1977 | Takase et al. | 415/1 |
| 4,022,423 | 5/1977 | O'Connor et al. | 415/203 X |
| 4,217,077 | 8/1980 | Brcar | 415/123 X |
| 4,236,867 | 12/1980 | Morris | 415/26 |
| 4,278,051 | 7/1981 | Shida | 415/1 X |
| 4,431,370 | 2/1984 | Ichikawa et al. | 415/1 X |
| 4,475,865 | 10/1984 | Sugishita et al. | 415/36 |
| 4,674,279 | 6/1987 | Ali et al. | 290/43 X |
| 4,780,051 | 10/1988 | Fisher, Jr. | 415/116 |
| 4,794,544 | 12/1988 | Albright et al. | 290/43 X |
| 4,806,781 | 2/1989 | Hochstetter | 290/43 |
| 4,823,018 | 4/1989 | Kuwabara et al. | 290/7 |
| 4,920,277 | 4/1990 | Kuwabara et al. | 290/43 X |
| 5,322,412 | 6/1994 | Erlach | 415/1 |
| 5,402,332 | 3/1995 | Kopf | 364/149 |
| 5,441,384 | 8/1995 | Gokhman | 415/161 |
| 5,742,515 | 4/1998 | Runkle et al. | 290/52 X |
| 5,754,446 | 5/1998 | Fisher, Jr. et al. | 415/17 X |
| 5,780,935 | 7/1998 | Kao | 290/52 |
| 5,864,183 | 1/1999 | Fisher, Jr. et al. | 290/43 |
| 5,941,682 | 8/1999 | Cybularz et al. | 415/115 |
| 5,947,679 | 9/1999 | Cybularz et al. | 415/17 |
| 5,947,680 | 9/1999 | Harada et al. | 415/17 |
| 5,954,474 | 9/1999 | Fisher, Jr. et al. | 415/17 |

OTHER PUBLICATIONS

*Experience With An Acoustic Cavitation Monitor For Water Turbines* article from ImechE 1992 (5 pgs.).

Technische Universitat Wien—8. Internationales Seminar Wasserkraftanlagen; Nov. 1994 (13 pgs.).

*Primary Examiner*—John E. Ryznic
*Attorney, Agent, or Firm*—Foley & Lardner

[57]  ABSTRACT

A process for operating a hydraulic machine, especially a hydro-turbine, includes the step of detecting an actual machine state during operation of the machine by ascertaining operating data. The ascertained operating data includes flow through the turbine (if present), effective and reactive power fed into the electric mains, guide vane opening, pressure before the machine and at the suction pipe exit, headwater level, and tailwater level. The method further includes the step of processing at least one state characteristic values of a first cavitation characteristic value (indicative of cavitation intensity), a second cavitation characteristic value (indicative of an abrupt rise in cavitation manifestations), vibration characteristic values, suction pipe pressure, sand concentration, air pressure, water temperature, and generator temperature (for example winding temperature). The method also includes the step of altering an operating point of the machine based on the at least one processed characteristic value to reduce cavitation and/or quiet running.

12 Claims, 13 Drawing Sheets

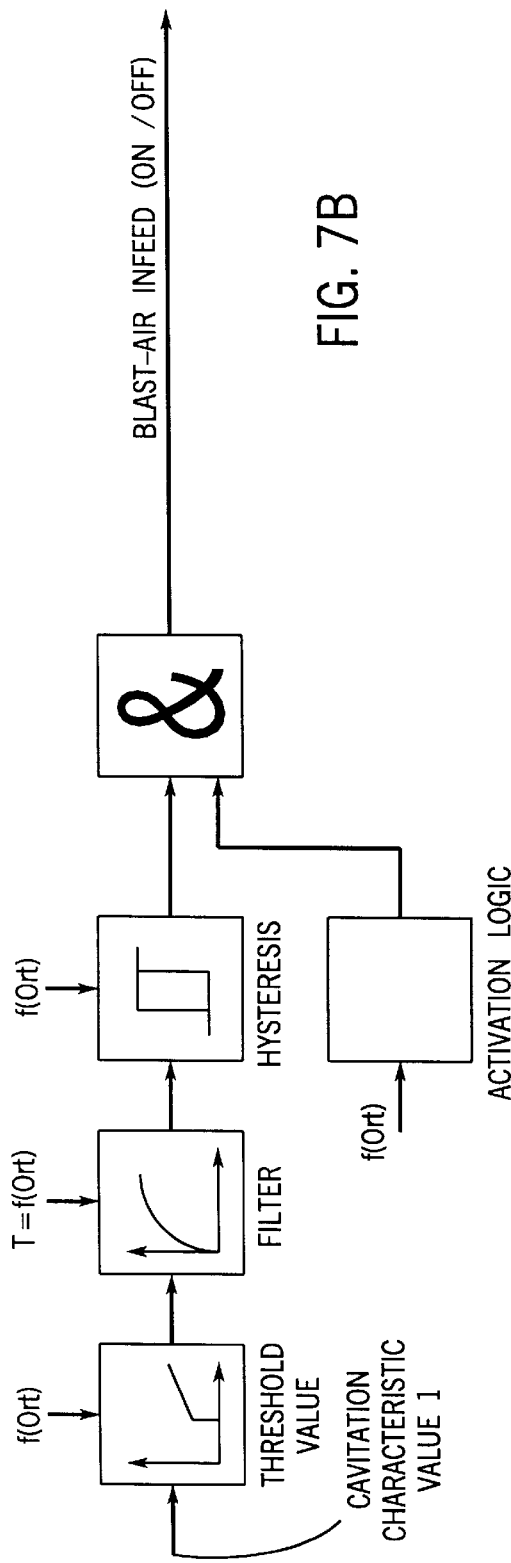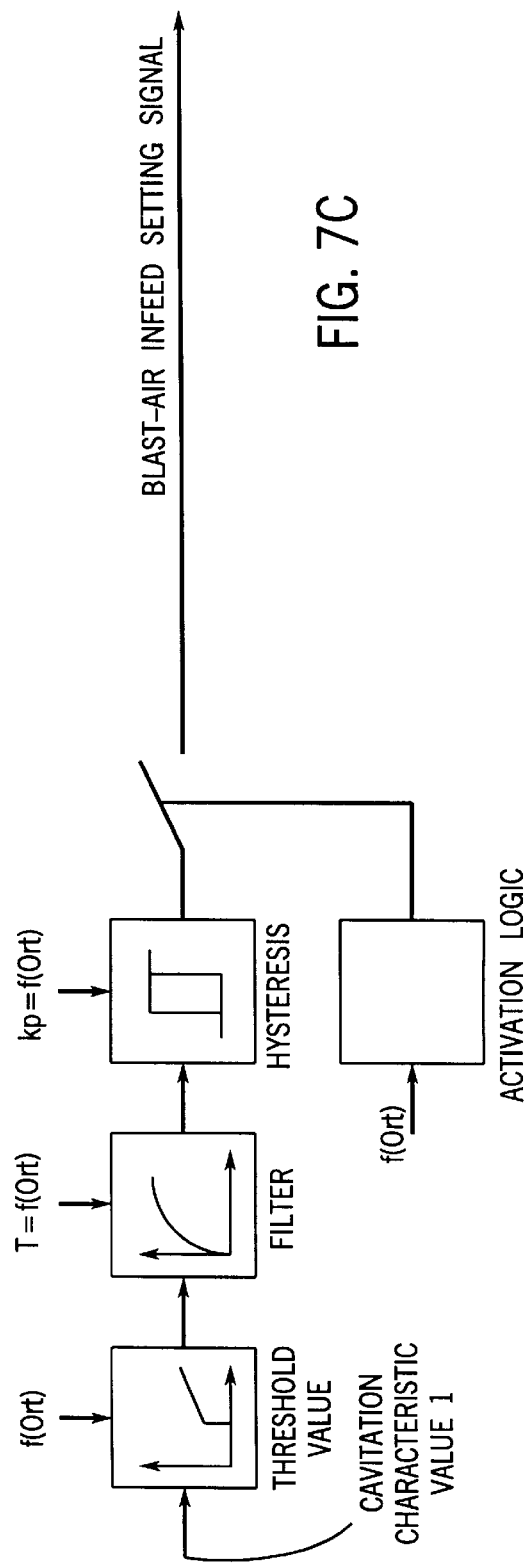

METHOD FOR OPERATION OF HYDRAULIC TURBINE

FIELD OF INVENTION

The invention relates to a process for operating a hydraulic machine, in particular a hydro-turbine.

BACKGROUND OF THE INVENTION

The cavitation limits of a hydraulic machine are ordinarily established today in the model test with the aid of a model machine which is very much smaller than the large execution, but is nevertheless homogenous (i.e., hydraulically "similar"). By way of the so-called similarity laws it is possible there with very good dependability to infer the behavior of the large execution. By the suction pipe cone of plexiglass and with the aid of a baroscope over the turbine cover, a visual assessment of the cavitation behavior is possible with the model machine.

According to the state of the art the cavitation limits ascertained in the model case converted for the large execution are deposited in the turbine regulator. In modern digital regulators this takes place in the form of characteristic curves, the maximally possible flow being taken as a function of the drop height. Appropriately, instead of the flow there is mostly given the maximal opening of the regulating unit (greatest setting angle of the guide vanes). In many cases there is additionally taken into consideration the influence of the tailwater level on the cavitation limits, i.e. the maximally allowable flow is defined by a characteristic curve family as a function of drop height and tailwater level. The regulator with the aid of these characteristic curves limits the regulating unit and therewith the flow through the machine, so that the admissible limit values cannot in any case be exceeded.

A further refinement is yielded by the consideration of the influence of the tailwater level on the cavitation limits, i.e. the maximally allowable flow is defined by the characteristic curve family as a function of drop height and tailwater level. The regulator with the aid of these characteristic curves limits the regulating unit and therewith the flow through the machine, so that the allowable limit values can in no case be exceeded.

The process hitherto of determining cavitation limit values suffers under a twofold defect. In the first place, there is no exact analogy between the relations of the model test on the one hand and those of the large machine on the other hand. Thus, for example, the water guidance in the model test is not always homogenous, so that in the larger execution there are found in part inflow conditions others than in the model.

In the second place, the cavitation limit values determined in advance by model test and calculation in advance are given firmly once and for all. They do not, therefore, take into account changes that set in during the life of the machine as well as during the life of the entire installation. These changes affect, for example, the geometric contour of the flow-conducting parts (for example of the guide vanes and of the runner blades), or changes that result by reason of sand erosion, rust, repairs, etc. in the course of time, but also changes in the inflow conditions of the machine (for example structural changes, sand banks in the flow bed, changed level of the tailwater level, etc.).

From these there result for the operator of the machine various restrictions and problems. Because of the above-described imponderables there is present, on the one hand, the risk that if the limits are set too generously, unnoticeably progressing cavitation damages will arise.

In order to avoid such damages, it would be possible to choose the cavitation limit values very restrictively. This means, however, that the operating and performance range of the machine is not optimally utilized. This is especially the case when the machine manufacturer, if he must guarantee a certain cavitation behavior for the given limit M, includes safety additions in his reckoning. This has the consequence that at the borders of the operating range there are zones in which possibly a safe operation or at least an operation with calculable risk would be possible, provided that the actual cavitation behavior of the machine is known, i.e. can be determined reliably from state magnitudes detectable by measuring techniques. In this manner, for example, in times of high load on the electric mains it is possible to generate valuable peak energy. Furthermore, in running water power works at high water an increase of the maximal continuous performance is possible.

Further, during operation through the above-mentioned longer-term changes on the machine under some circumstances there is yielded a restriction of the cavitation-free operating range, so that the pre-set limits that were valid for the new machine, are no longer valid for the actual machine state. If the machine continues to be operated in the original manner, this can lead to ever farther progressing damages.

Furthermore, also within the admissible operating range there are unfavorable zones which should be avoided for the sparing of the machine. This was not possible with the apparatus-technical solutions of hitherto, since it was not possible to detect these zones.

An especially serious problem for the operator is presented by the dependence of the erosion danger on hitherto undetectable border conditions. There is to be mentioned, in particular, the sediment concentration. Cavitation in conjunction with high sand concentration leads, in certain operating ranges, to especially severe manifestations of erosion. This results in rapid changes on the blade surface, which contributes to a further reinforcing of the effect. This multiple effect, therefore, is especially dangerous.

For the measurement-technical detection of cavitation, various processes are known. One possibility, for example, is presented by the use of body-sound sensors designed especially for very high frequencies (100 KHz to 1 MHz), which are mounted on the turbine housing. For the further processing, the formation of two characteristic values has proved useful (W. Knapp, C. Schneider, R. Schilling "A monitor system for the acoustic cavitation monitoring of water turbines," 8th International Seminar on "Hydraulic power installations," TU Vienna, 1994). Characteristic value 1 represents the sum effective value of the high-pass filtered time signal. This characteristic value permits a quantitative statement about the cavitation load. Characteristic value 2 is a number signal. The evaluating apparatus here counts the peaks over a pre-defined time window, in which each peak represents the action of a bursting cavitation bubble. This characteristic value is well suited for the detection of the cavitation onset, because at first it rises very steeply and with fully developed cavitation it goes over into a saturation range.

SUMMARY OF THE INVENTION

Underlying the invention is the problem of giving a process for the operating of a hydraulic machine, which makes it possible, during the operation of the large machine, to detect the cavitation limits as exactly as possible, so that, on the one hand, cavitation safety is given to a still higher degree and that, on the other hand, there is obtained a maximal utilization of the machine performance.

This problem is solved by the features of claim 1.

According to the invention it is proposed, therefore, to detect the actual state of the machine during operation, in order automatically to extend the operating range of the machine so that machine treatment and maximizing of the energy generation as well as a flexible operation guidance can be optimally attuned to one another. In the event that, by the operation guidance, a working point is prescribed within a critical zone (therefore within a range which in solutions of hitherto was deliberately excluded from the outset), the setting magnitude is automatically regulated in such manner that on the machine, just barely still, no dangerous erosion occurs.

The statements about the cavitation behavior of the machine are based essentially on measured cavitation characteristic values. With the aid of characteristic data that are derived from the machine model, therewith, an evaluation is also possible (type of cavitation, harmful effect). By inclusion of further state characterizing values these statements can be further confirmed.

A further feature of the invention is the optimization of the air infeed. In many turbines cavitating turbulences in the blade channel and in the suction pipe lead to a rough behavior of the machine with disagreeable side effects (rumbling, shaft vibrations, building vibrations, etc.). For the calming of the turbulences in these operating ranges (for example over the turbine shaft or other places) air is fed in. The compressor needed for the generation of the blast air needed in certain cases has a relatively great energy consumption.

Considerable savings in energy, therefore, are possible if the blast air infeed is not activated in a permanently prescribed operating range, but precisely when it is required by reason of the cavitation behavior of the machine.

The processes described can be used for all types of hydraulic flow machines.

As operating data there are processed inter alia the following:

Flow through turbine (if present)

The effective and reactive power fed into the electric mains

Guide vane opening

Pressure before the machine and at the suction pipe exit

Headwater level

Tailwater level

As state characteristic values there are processed inter alia:

Cavitation characteristic value 1

Cavitation characteristic value 2

Vibration characteristic values

Suction pipe pressure

Sand concentration

Air pressure

Water temperature

Generator temperature (for example winding temperature)

The process is not restricted to the recounted measurement data. The system can call upon further-characteristic values for the refining of the evaluation, or for the confirmation of the indications. Furthermore, not all of the signals mentioned are required for the application of the process. Lacking characteristic values are replaced by standard assumptions (experience values) or calculated with the aid of the machine model.

The invention can also be used on old machines for which no model data are present. In regard to old machines, in many cases it is even the sole possibility for obtaining dependable indications about the admissible operating range.

BRIEF DESCRIPTION OF THE DRAWINGS

The invention is explained in the following with reference to the attached figures, in which:

FIG. 7b shows a second branch of the performance control for optimizing the blast-air infeed in dependence on the cavitation state for arrangements in which the blast-air is switched on/off;

FIG. 7c shows a second variant of the second branch of FIG. 7b for arrangements in which the blast-air amount can be controlled quantitatively;

DETAILED DESCRIPTION OF A PREFERRED EXEMPLARY EMBODIMENT

Figure 1:
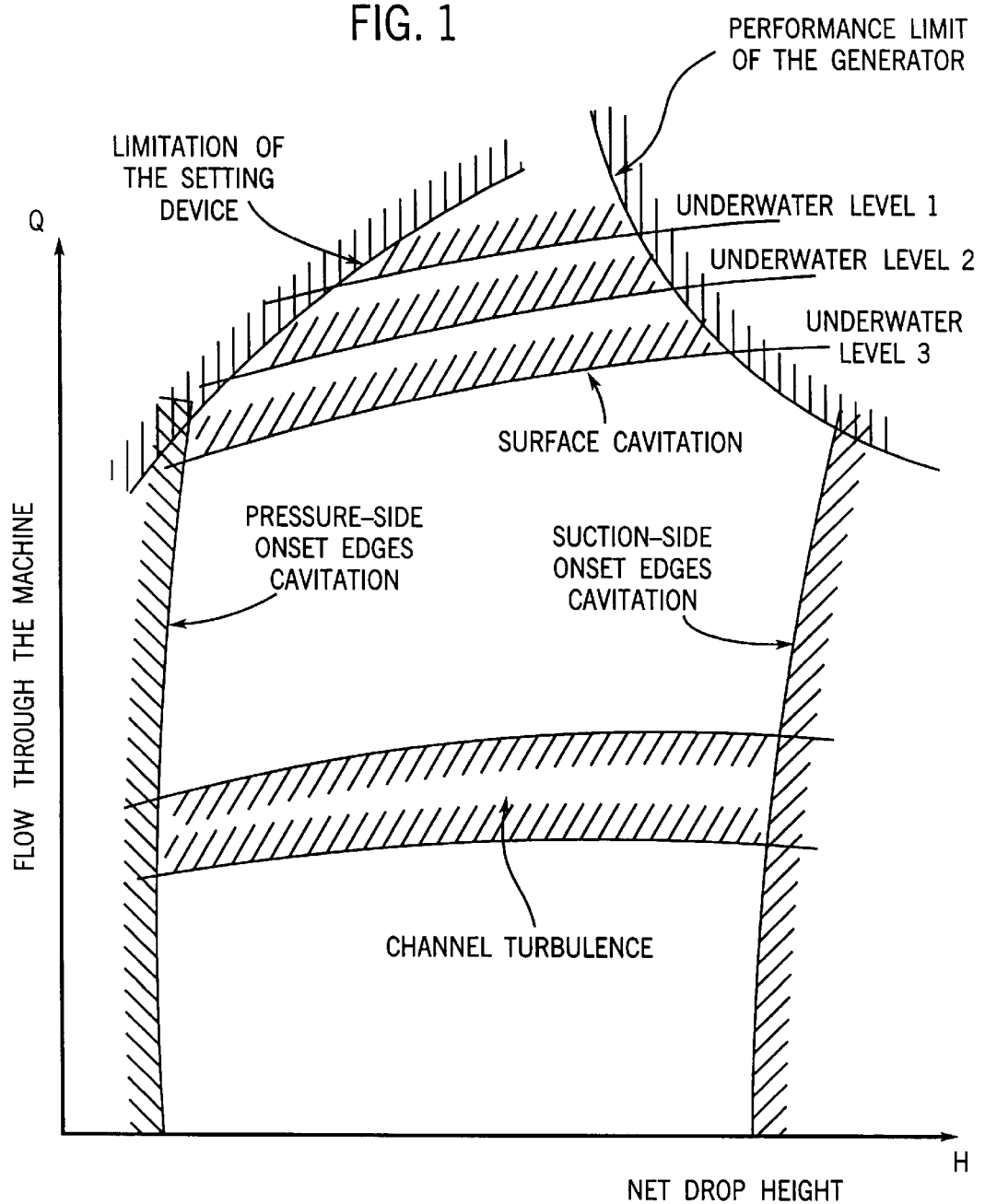
FIG. 1 shows a Q-H diagram (Q=flow through the machine, H=net drop height) including the limits which ordinarily have to be taken into account with a hydraulic machine.

FIG. 1 qualitatively shows, in a Q-H diagram (Q=flow through the machine, H=net drop height), the most important limits which ordinarily have to be taken into account with a hydraulic machine in which, depending on the design and type of the machine, not all the limits are always relevant. Besides the cavitation limits, the limit of the setting unit (maximal guide vane opening) as well as the performance limit of the generator are to be included. Furthermore, it is to be heeded that the cavitation limits shift as a function of the tailwater level.

Figure 2:
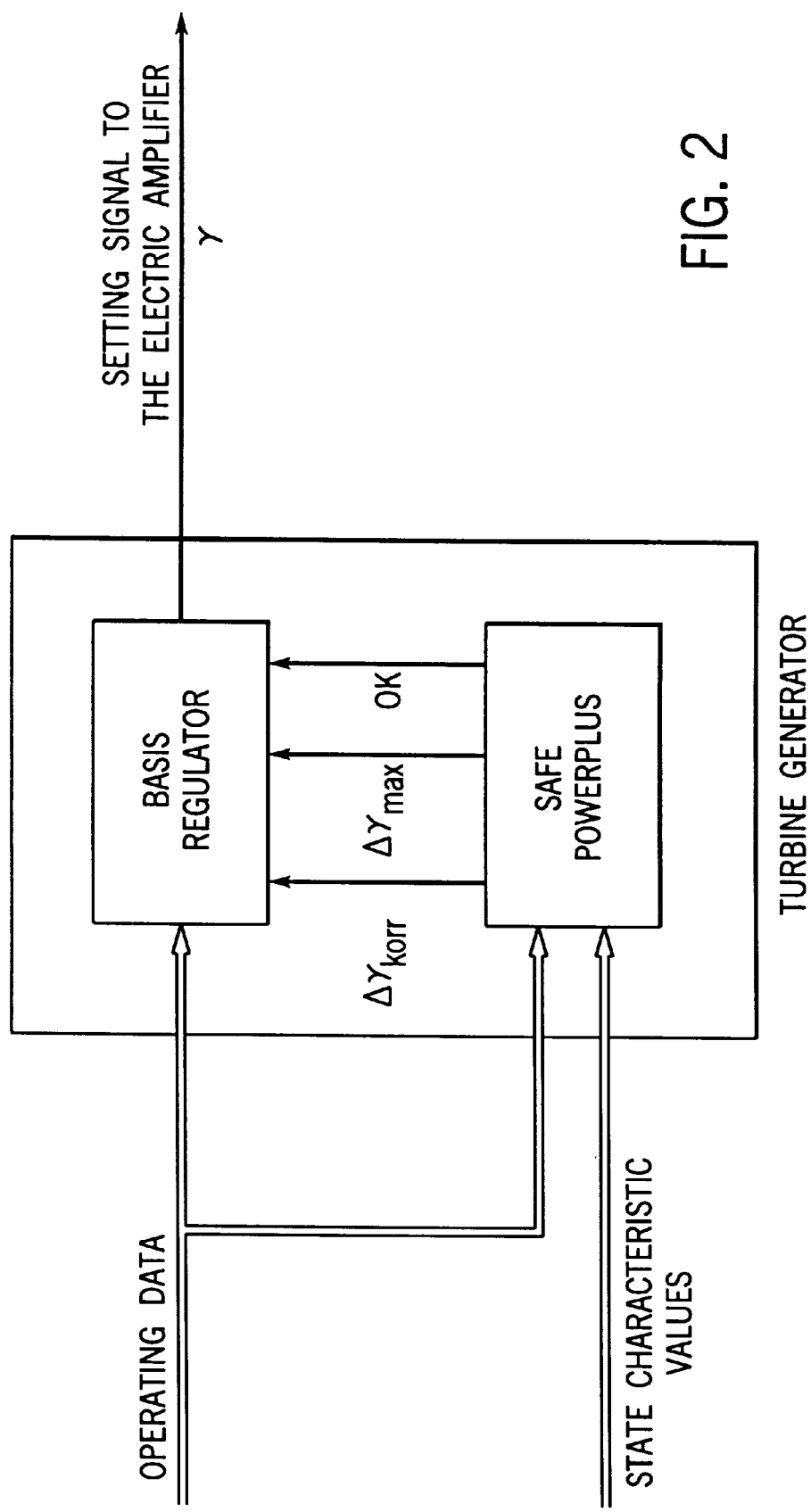
FIG. 2 shows a large overview of the integration of the "PowerPlus" module into a digital turbine regulator.

FIG. 2 first of all explains, in a large overview, how the module "PowerPlus" is integrated into a digital turbine regulator. The block designated basis regulator presents there the largely unaltered regulator in the form of hitherto. As input magnitudes there are provided the operating data that are processed by the regulator as well as additional state characteristic values. The realization of "PowerPlus" as an integral component of the digital turbine regulator allows an optimal embedding of the extended functions as supplementation to the traditional regulator functions. In the definition of a corresponding interface, however, there is also possible a realization of "PowerPlus" as an external apparatus (SPS or digital computer).

Figure 3:
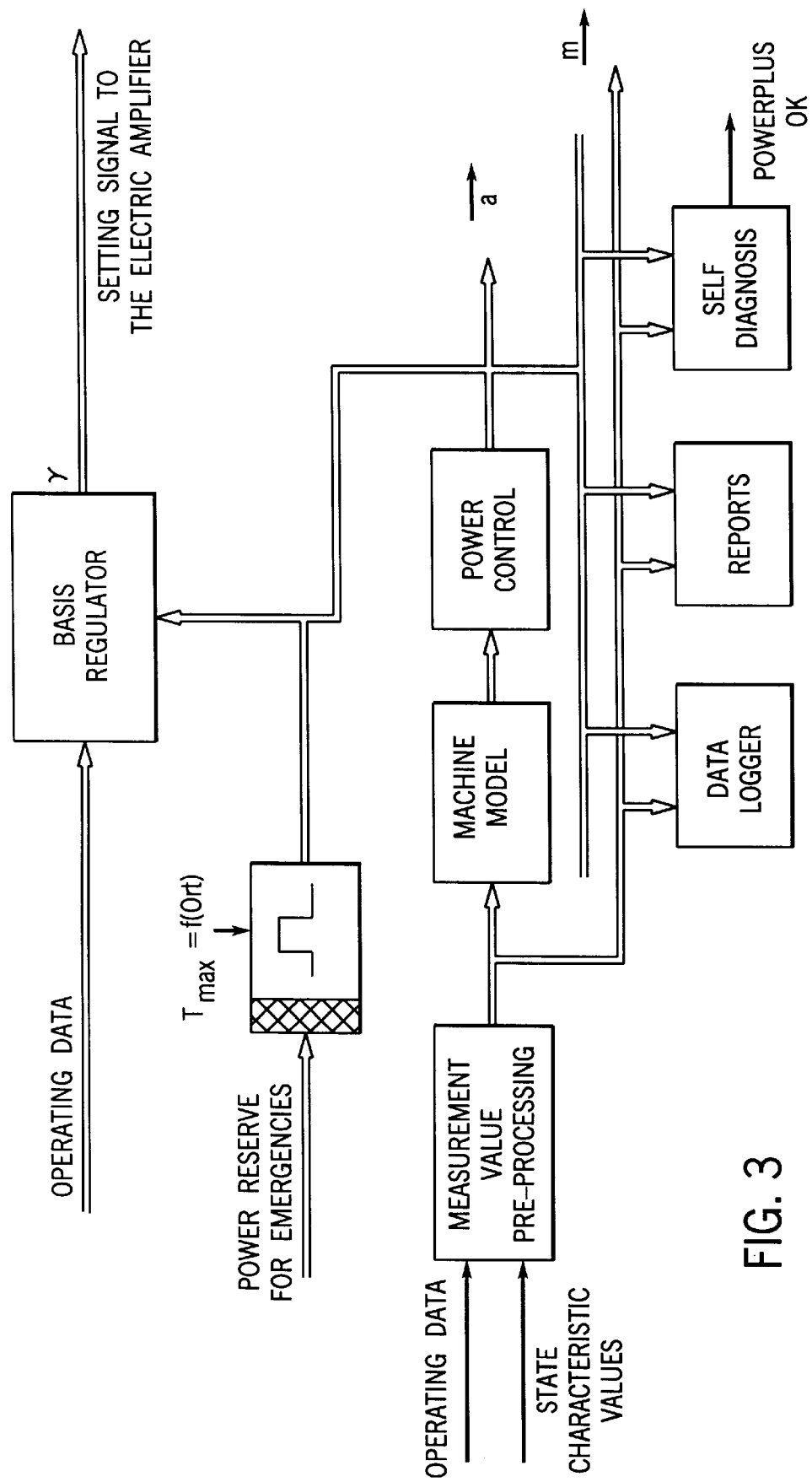
FIG. 3 shows a schematic representation of the structure of the "PowerPlus" module.

The structure of the module "PowerPlus" is shown in FIG. 3. The operating data input magnitudes and the state characteristic values are first worked up in the measurement value preliminary processing. The result, the measurement vector m, is represented as a double arrow to clarify the fact that here it is a matter of a field of several magnitudes. From the measurement value vector, and with the aid of the machine models, the basic data are formed for optimal performance. The measurement value vector m and the evaluating vector a are fed, besides to the regulator, to the data logger module, and to the message generation and intrinsic diagnosis modules.

Figure 4:
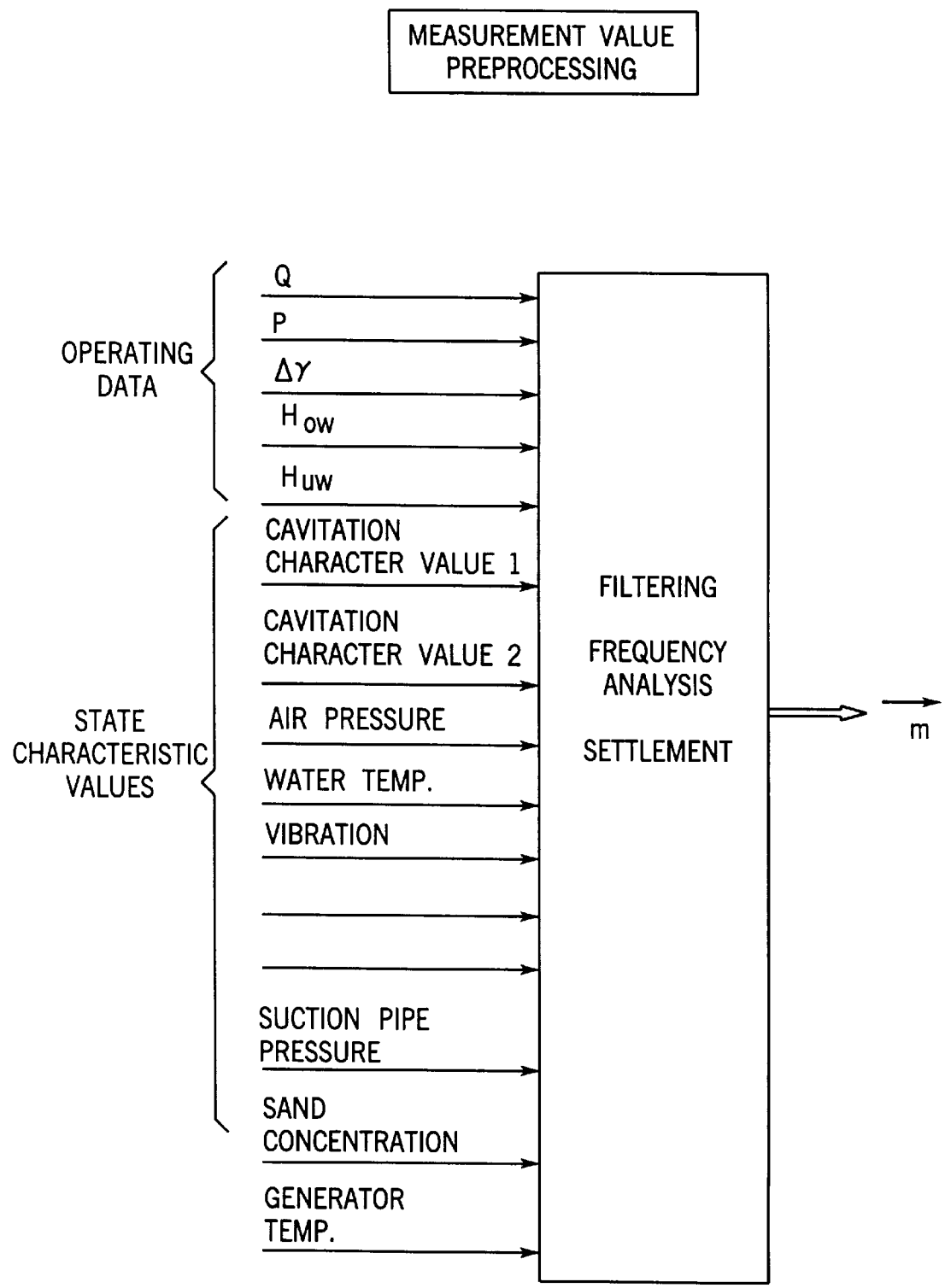
FIG. 4 shows a schematic representation of the measurement value processing.

In FIG. 4 the measurement value processing is schematically represented. In this submodule, operating data and state characteristic values are worked up for further processing in the other submodules. The measurement values there can come directly from sensors or it can be a matter of already pre-processed data (for example cavitation characteristic values, vibration characteristic values). The type of evaluation is governed according to the characteristic value. This can be a filtering, a frequency analysis, but also an arithmetic linkage of different characteristic values.

Figure 5:
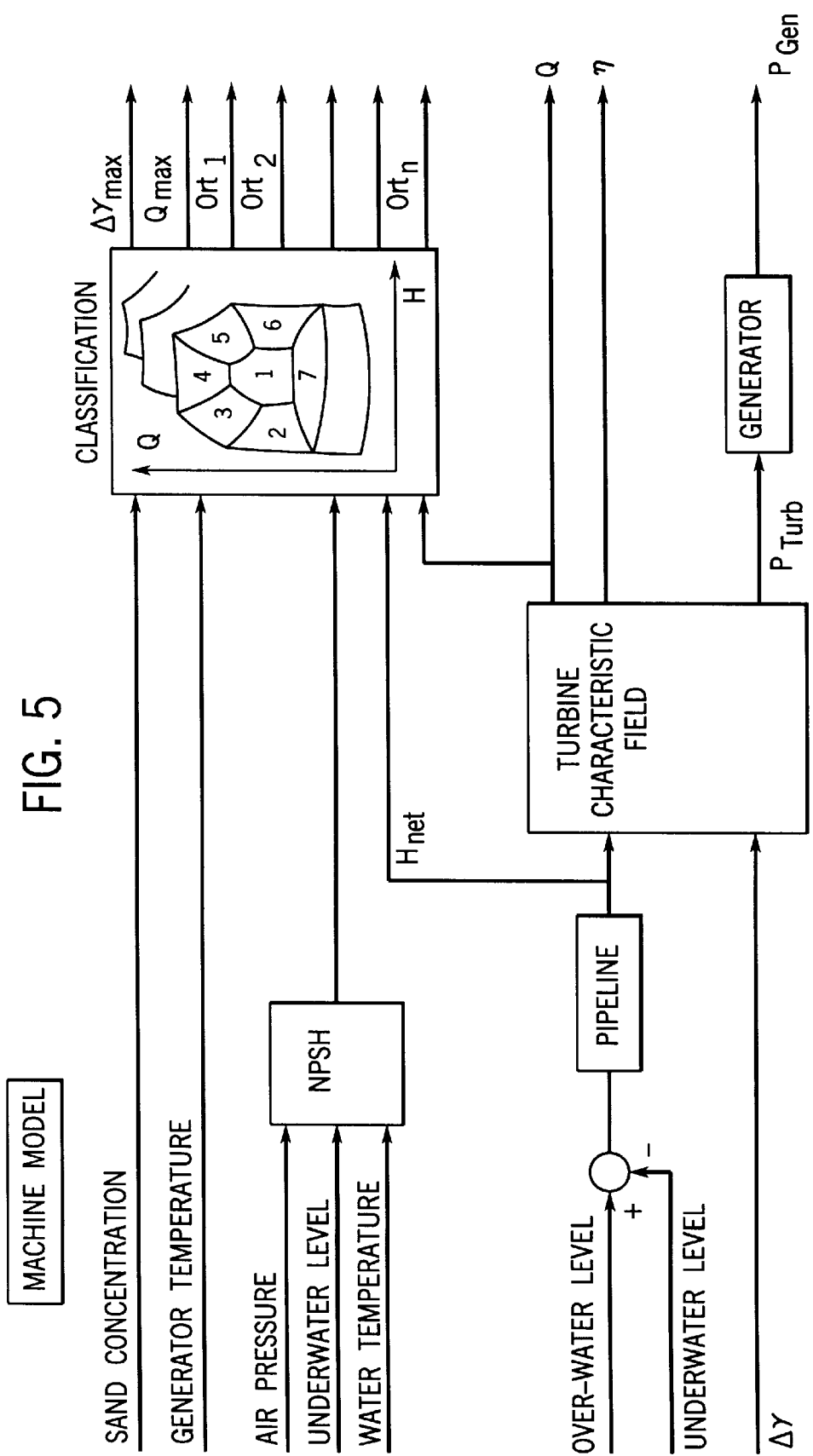
FIG. 5 shows a schematic representation of the machine model used to determine the hydraulic operating point of the machine.

FIG. 5 shows the schematic structure of the machine model. The machine model serves for one thing to determine the hydraulic operating point of the machine, characterized by flow or performance, by the net drop height and by the NPSH value. This takes place in the block pipe line, turbine characteristic field, generator and NPSH. The NPSH value (net positive suction head) is calculated from tailwater level, air pressure and water temperature. It describes the distance of the static pressure from the vapor pressure of the medium and it influences, therefore, the cavitation danger and therewith the limits of the admissible operating range.

The configuration represented presents merely an example for the evaluation which is carried out on the basis of the typically present measurement and model data. In the individual case, with changed boundary conditions, the machine model can be structured entirely differently. Thus, for example, as input magnitude for the turbine characteristic field, the generator performance $P_{gen}$ is usable instead of the guide vane opening $\Delta\gamma$. The aim is in each case the determination of the hydraulic working point of the machine, which makes possible a classification and evaluation of the measured cavitation characteristic values.

Figure 6A:
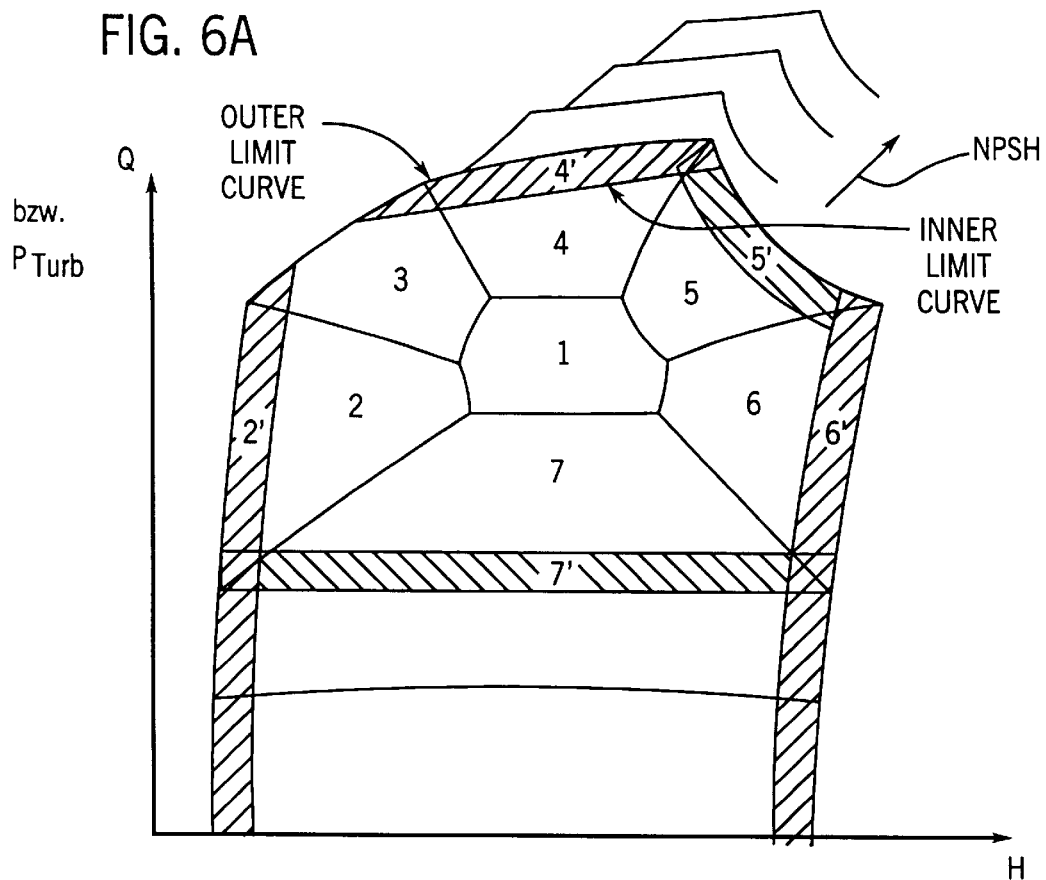
FIG. 6a shows a Q-H or P-H diagram (P=turbine performance) for determining the position of the working point therein.

According to FIG. 6a there is determined first of all the position of the working point in the Q-H diagram (Q=flow, H=net drop height) or P-H diagram (P=turbine performance). In this diagram two boundary lines are drawn, in which, strictly speaking, it is a matter of a limit line family, since for each NPSH value other limits hold. The outer limit $\Delta\gamma_{max}=f(H, NPSH)$ or $Q_{max}=f(H, NPSH)$ represents the absolute limit of the operating range, which for reasons of safety must not in any case be exceeded. The inner curve bounds the range which, without additional monitoring measures, can be regarded as safe. This is the limit which in solutions of hitherto was to be observed, either forced by the automatic system or forced by the operating instructions of the machine manufacturer. In between there is located the above-addressed "gray zone", in which the automatic performance optimization becomes effective.

Moreover, in the classification an allocation is made for the type or place of the cavitation. The hydraulic engineer distinguishes according to place, where the cavitation manifestation arise, inter alia pressure-side onset edge cavitation suction-side onset edge cavitation surface cavitation cavitation channel turbulence.

Furthermore there is taken into account the performance limit prescribed by the thermal overload limit of the generator as well as the limitation of the setting unit. The performance limit of the generator can optionally be followed up in dependence on temperature.

The interrelation between cavitation phenomena and hydraulic working point is known to the hydraulic engineer. This knowledge is registered in the classification module by the definition of zones for Ort1 (locus1), Ort2 to Ortn. In dependence on the membership to the zone Ort<|>, in the performance control the parameters of the time-dependent and time-independent regulating circuit members are switched over. Ort<|> establishes there in each case the index of the parameter which is to be activated for the particular zone.

Figure 6B:
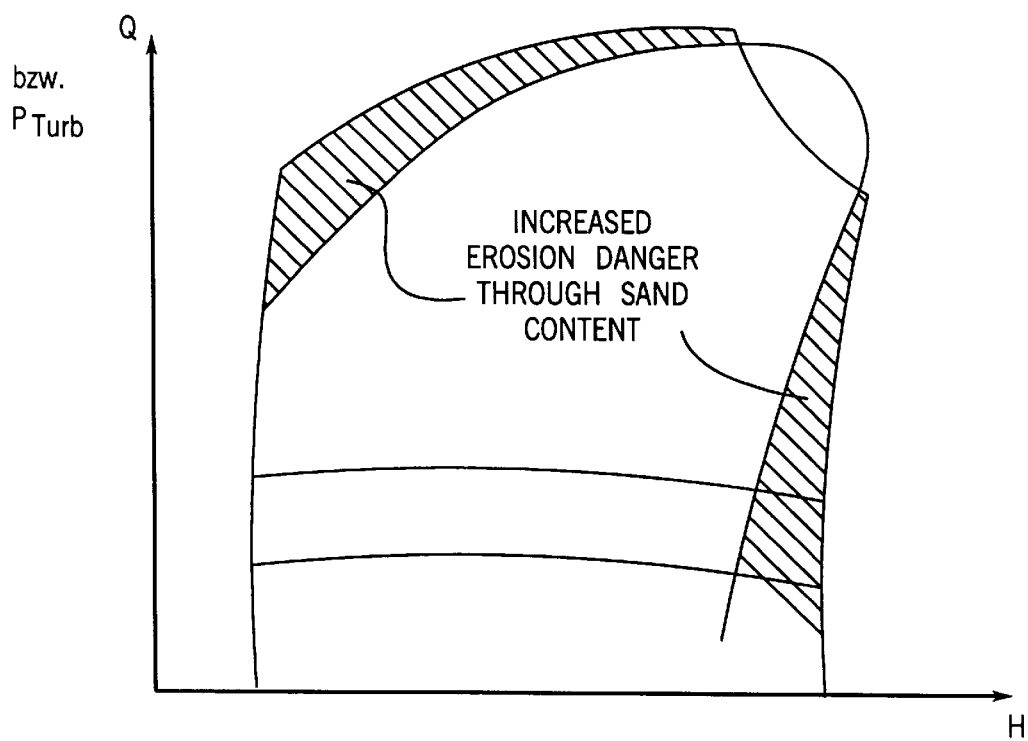
FIG. 6b shows a Q-H or P-H diagram for further refining the classification by the consideration of the sand content in the medium.

A further refinement of the classification can be achieved by the consideration of the sand content in the medium (FIG. 6b). This is associated with the fact that in certain operating ranges, the erosion danger increases clearly with increasing sand content. The performance control takes this into consideration in the manner that, if the corresponding characteristic value indicates increased sand content, the evaluation of the cavitation characteristic values is altered in such manner that these zones are avoided.

Figure 7A:
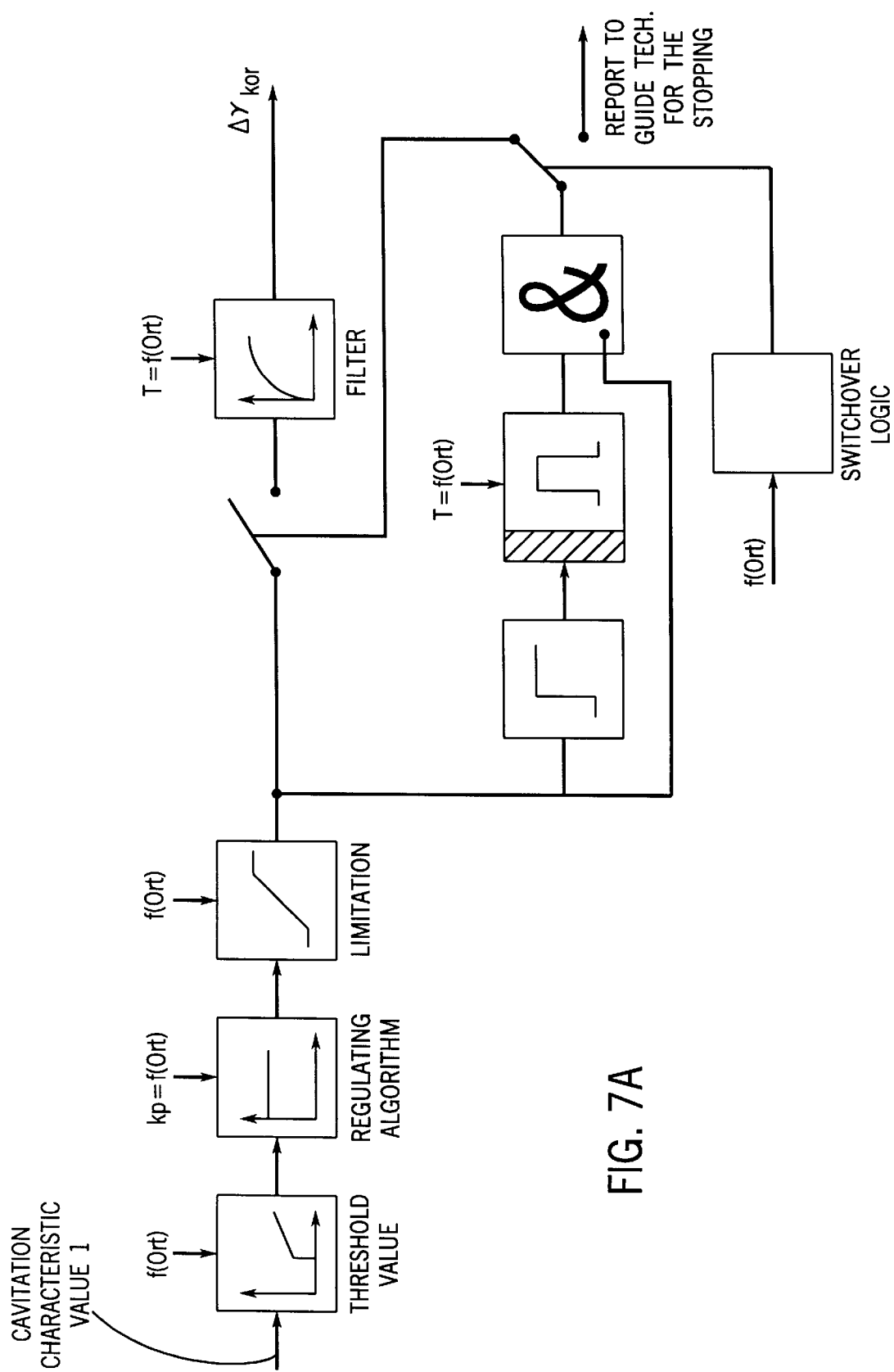
FIG. 7a shows a schematic representation of the functions of the performance control.

FIG. 7a is a schematic representation of the functions of the performance control.

In the first place, the performance control calculates a sign-affected correction value $\Delta\gamma_{korr}$ which is added to the setting signal. The arrangement presents essentially a regulator with arbitrary dynamic properties, which sets the working point of the machine so that the cavitation characteristic value 1 lies below a settable threshold value. In the simplest case the regulator is represented as in FIG. 7a by a simple proportional member, the amplification of which, to be sure, is steadily adapted to the operating point (kp=f (Ort)). By means of a limiter, for reasons of safety, the engagement possibility of "PowerPlus" can be limited. The filter prevents abrupt changes of performance. Furthermore, a mathematical logic is provided which switches in the engagement of "PowerPlus" only after run-off of a time delay. This is required inter alia since certain zones, especially in the partial load range must necessarily be run through in operating transitions.

All the parameters of the regulating circuit members can be switched over as a function of the results of the classification, i.e. it is a matter in each case of parameter sets that are indexed over Ort<|>(in the block diagrams this is indicated in each case by the indication f(Ort)). By sign reversal in the amplification especially also the action direction of the correction value $\Delta\gamma_{korr}$ can be reversed. In the range of the surface cavitation limit, for example, in cavitation the guide vane opening is to be reduced (negative sign of $\Delta\gamma_{korr}$). In channel turbulence cavitation, in contrast, several possibilities are given for leaving the critical range:

increasing of the flow through the turbine (positive $\Delta\gamma_{korr}$)

decreasing of the flow through the turbine (negative $\Delta\gamma_{korr}$)

instruction to the control technology for the stopping of the machine.

FIG. 7b shows a second branch of the performance control. This optimizes the blast-air infeed in dependence on the cavitation state. In a first variant the system, on the basis of the cavitation characteristic value 2, renders the decision as to when the blast-air infeed is switched on; i.e., a binary signal is derived for the decision blast-air on/off. If the cavitation characteristic value 2 exceeds a settable threshold value, then if the signal Ort<|> indicates a certain zone (for example cavitating channel turbulence), the blast-air infeed is switched on. The filter serves for the suppression of brief peaks, while the hysteresis block prevents excessively frequent switchings on and off of the blast air infeed.

The second variant (FIG. 7c) is meant for arrangements in which the blast-air amount can be controlled quantitatively (for example over a choke valve). Here, instead of the hysteresis member, there is provided a proportional member. In this solution the amount of air is influenced over the cavitation behavior and, namely, so that increasing cavitation leads to an increase of the amount of air.

Figure 8A:
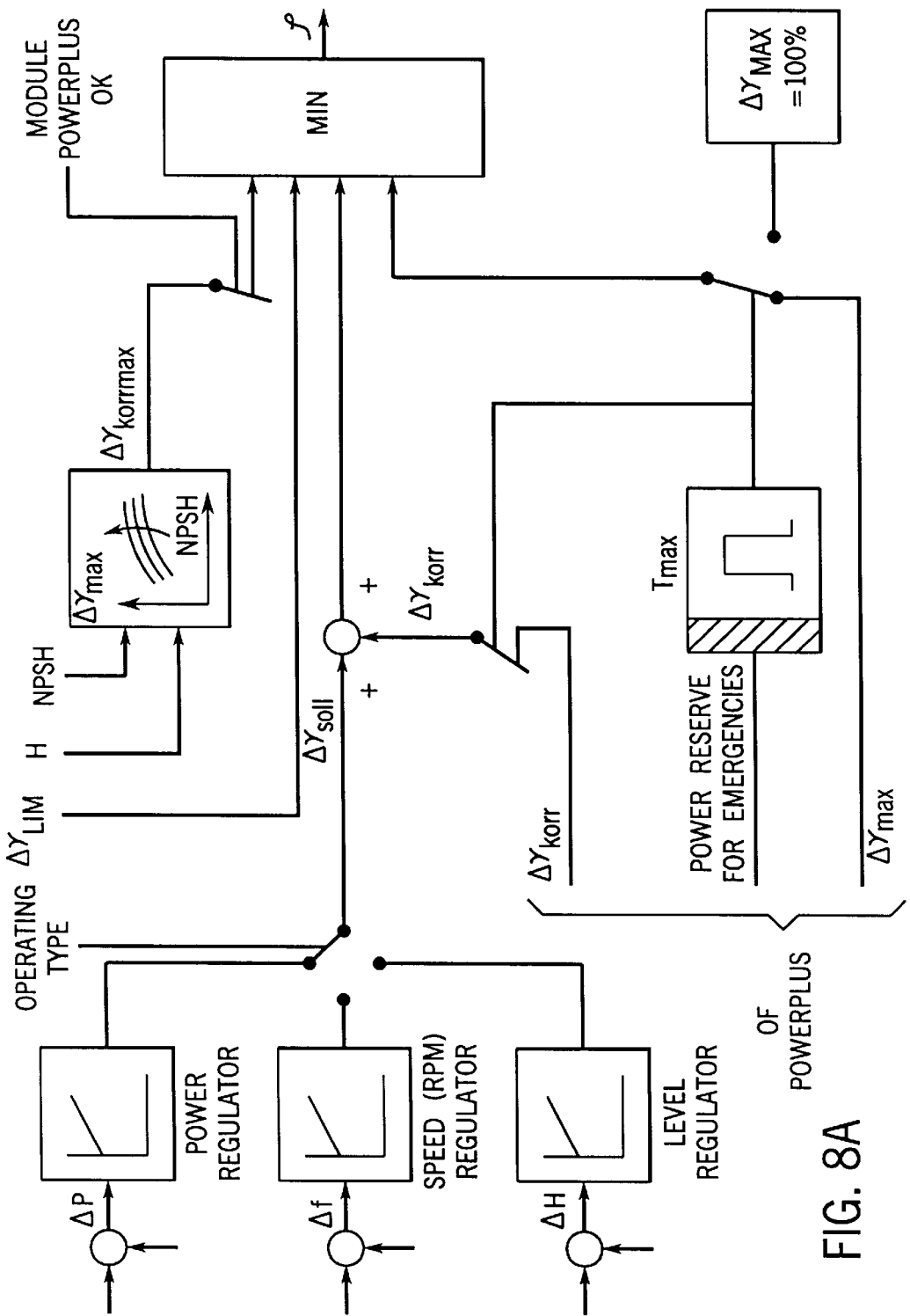
FIG. 8a shows a cut-out from the block structure of the turbine regulator for clarifying the tying-in of the results of "PowerPlus"

FIG. 8a shows, for the clarification of the tying-in of the results of "PowerPlus", a cut-out from the block structure of the turbine regulator. The regulating algorithm belonging to the momentary active operating type (performance regulation, water state regulation, turning-rate regulation etc.) delivers the desired value for the setting signal $\Delta\gamma_{soll}$. For this, first of all, the sign-affected correction value $\Delta\gamma_{korr}$ determined by "PowerPlus" is added. In the block MIN there then occurs a minimal value selection. Thereby there is yielded the possibility of limiting the setting signal with a manually adjustable opening limitation. Furthermore, the absolute limit prescribed by "PowerPlus"

$$\Delta\gamma_{max}=f(H, NPSH)$$

is forced over the minimal value selection.

A further limitation is activated if the self-diagnosis of "PowerPlus" ascertains that the system does not operate correctly. By closing of the logical switch provided for this eventuality a firmly predetermined curve family becomes active, $$\Delta\gamma_{korrmax}=f(H, NPSH)$$

which restricts the operating range to the above-mentioned inner limit. Therewith it is assured that on dropout of "PowerPlus" the regulator operates in the same manner as in the solutions of hitherto.

In supplementation to the here-described realization, without changes in the theoretical manner of the process function, alternative onset points for the correction signal are possible. Thus, the correction signal can also be summed up for the regulating difference at the input of the regulator for the individual operating types. Furthermore there is present the possibility that the minimal selection between $\Delta\gamma_{korr}$ and $\Delta\gamma_{max}$ occurs already in the module "PowerPlus" and the minimum of the two magnitudes is switched onto the block MIN of the regulator.

A further engagement possibility is provided for the activation of a power reserve for a limited span of time. There, in case of power-mains problems, for the support of the power mains independently from the cavitation state of the machine, for the time $t_{max}$ a limitation of the operating range is deliberately dispensed with. In this mode and for a settable time, material loss by cavitation erosion is deliberately accepted into the bargain in favor of the fulfillment of a superordinated purpose.

For this, in a first variant in response to a corresponding request from the operating management, the output to the electrical amplifier is controlled for the time $t_{max}$ in such manner that the setting member opens the guide vanes up to the mechanical limit. All the limitations are disregarded for this period of time.

Figure 8B:
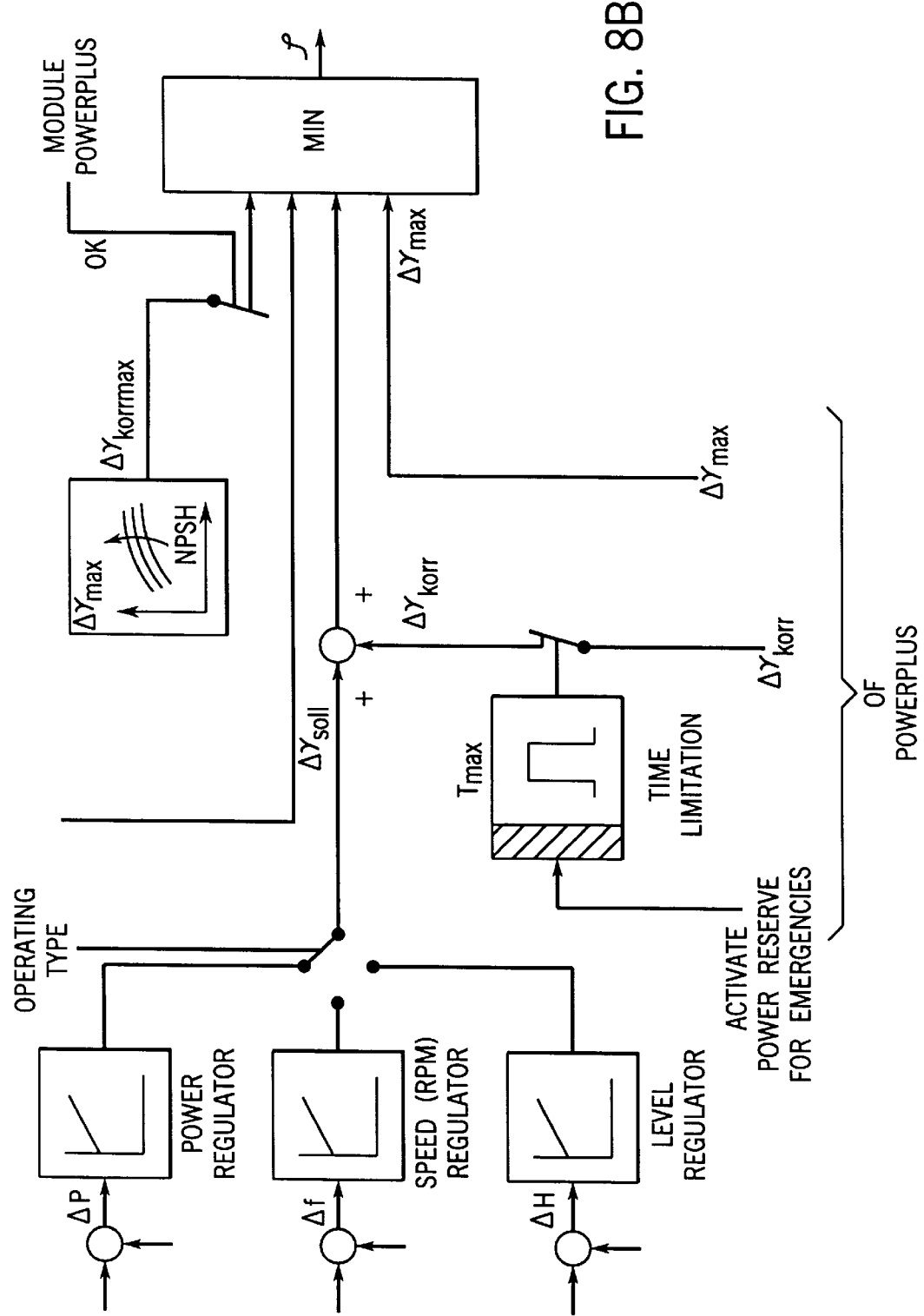
FIG. 8b shows a second variant of the block structure of the turbine regulator shown in FIG. 8a, which provides for suppressing only the correction signal.

Alternatively to this, a second variant (FIG. 8b) provides for suppressing only the correction signal. The predetermined limitation over $\Delta\gamma_{max}$ (outer absolute limitation of the operating range), however, is active as before.

In the overview representation in FIG. 3, further blocks are drawn in, which blocks further process the data which are generated by the above-described functions. The block Data logger makes possible a gap-free documentation of the machine state. The data base generated here can be used externally with suitable computer programs in order to detect and to evaluate longer-term changes on the machine or installation. Furthermore, the correlation between the measurement data and the material removals observed in reviews permits a calibration of the cavitation characteristic values.

The block Report documents all happenings and the interventions of the module, and thus makes the functioning manner of "PowerPlus" transparent to the user.

The block self-diagnosis uses redundant information data (for example measurement, model computation) in order, with the aid of plausibility tests, to recheck the functions of "PowerPlus" and of the measuring technique. As soon as inconsistencies are detected there immediately occurs, besides a report, the automatic deactivation of the module.

The components necessary for the realization of the invention may be integral components of the turbine regulator. It is obvious that the measured state characteristic values in general do not yet suffice to use the process of the invention. On the contrary, it is necessary to classify the machine model in order to determine the type of cavitation for the machine concerned. It is to be ascertained, therefore, whether it is a matter of surface cavitation, suction-side and pressure-side entry cavitation, or of cavitation turbulences.

Figure 9A:
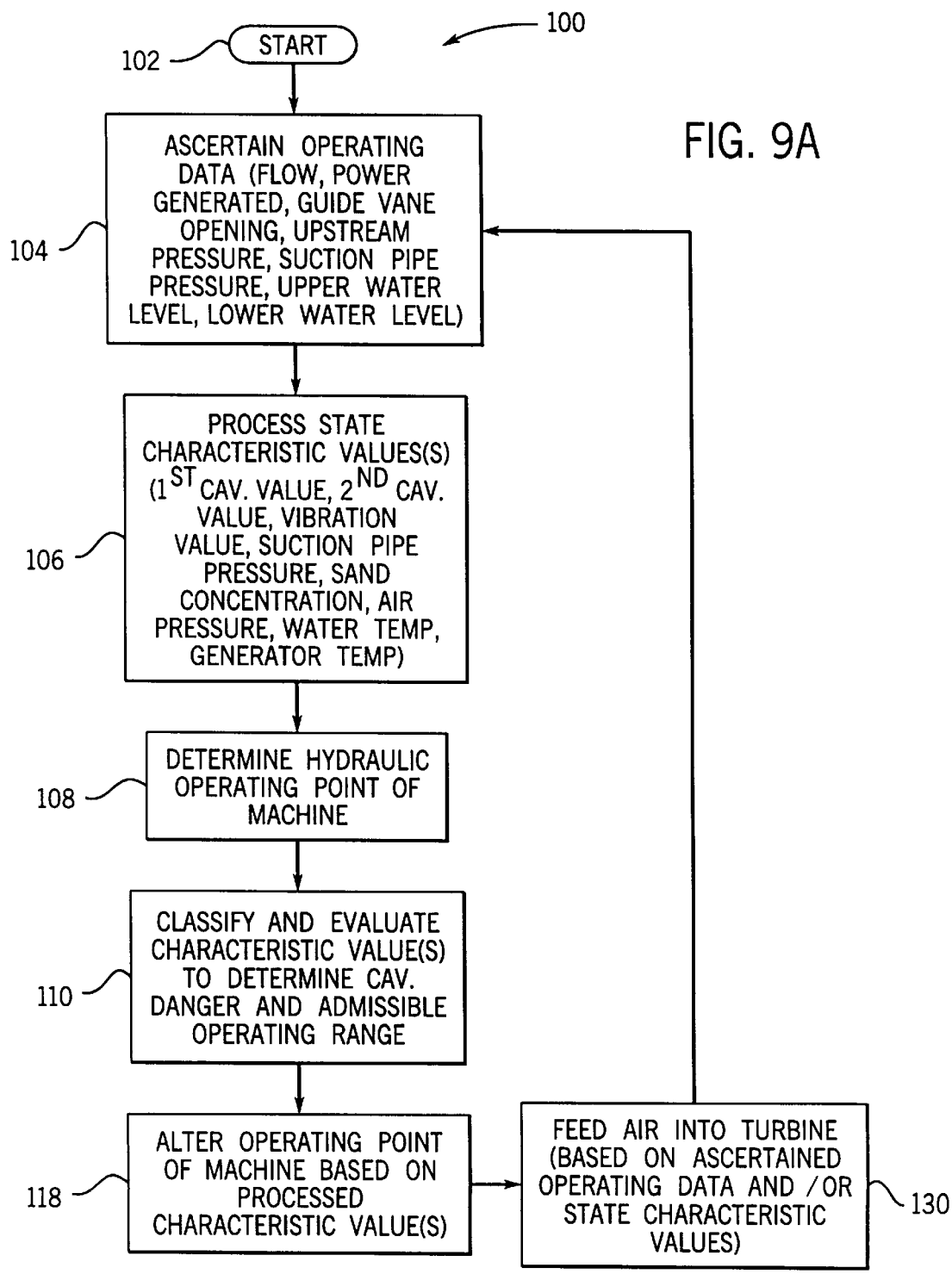
FIGS. 9a–9c are flow charts illustrating exemplary process steps for operating a hydraulic machine and system in accordance with certain aspects of the invention.
Figure 9B:
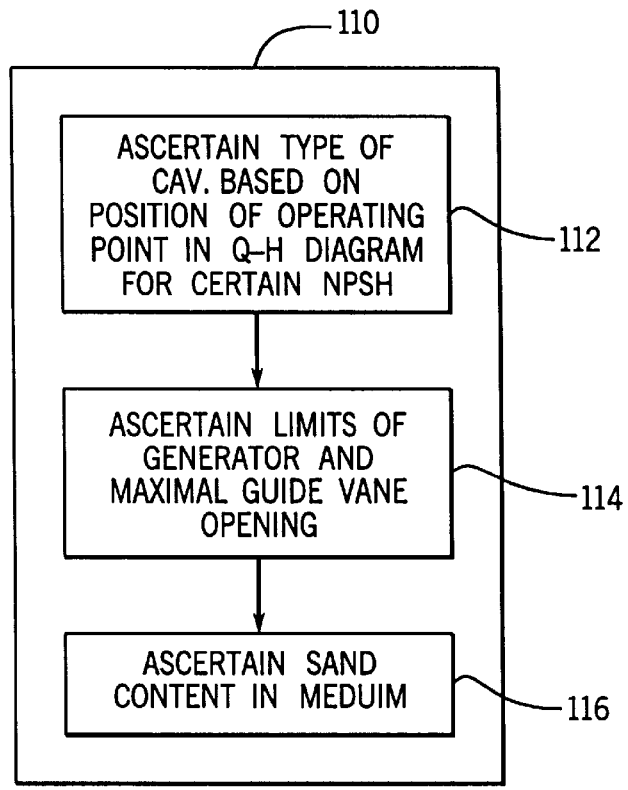
Figure 9C:
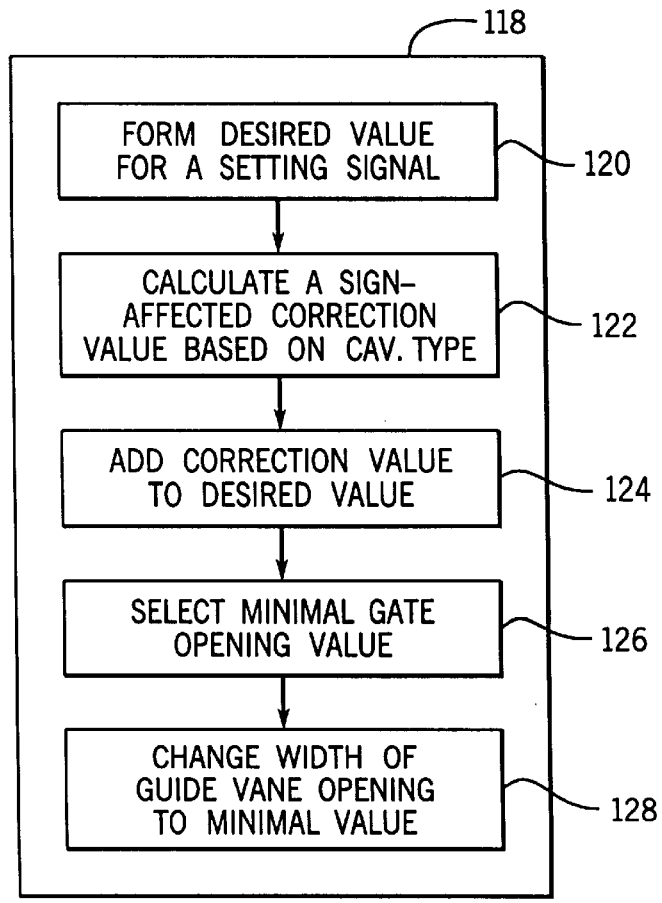

FIGS. 9a–9c represent exemplary process steps implemented by the above-described and illustrated digital turbine regulator including the "PowerPlus" module integrated therein. In particular, FIG. 9a represents exemplary steps of a process for operating a hydraulic machine to reduce cavitation and/or quiet running; FIG. 9b represents exemplary steps for classifying and evaluating characteristic values for use in the process of FIG. 9a; and FIG. 9c represents exemplary steps for determining a correction value and altering the gate opening for use in the process of FIG. 9a.

Returning now to FIG. 9a, the "PowerPlus" process, designated generally by reference numeral 100, begins at step 102 wherein the main process loop is implemented by the regulator of FIG. 2. At step 104, the regulator determines the actual machine state during operation of the turbine by ascertaining operating data through the use of sensors. In the illustrated embodiment, the operating data ascertained during this step includes flow through the machine, effective and reactive power fed into electric mains, guide vane opening, pressure upstream of the machine and at a suction pipe exit, headwater level, and tailwater or lower water level.

In addition to the sensed or measured operating data, the regulator processes one or more state characteristic values in step 106. In the illustrated embodiment, the state characteristic values may include any/all of a first cavitation characteristic value, a second cavitation characteristic value, vibration characteristic values, suction pipe pressure, sand concentration, air pressure, water temperature, and generator temperature. The operating data input magnitudes and state characteristic value(s) are inputted to the filtering, frequency analysis block of FIG. 4 to produce the measurement vector m.

In step 108, the hydraulic operating point of the machine, characterized by flow performance, by the net drop head, and by the NPSH value, is determined by the machine model of FIG. 5. Based on the hydraulic working point of the machine, the measured cavitation characteristic values are classified and evaluated to determine the danger of cavitation along with the admissible operating range of the machine.

In step 110, the sensed and/or processed characteristic values are classified and evaluated. As illustrated in FIG. 9b, step 110 preferably comprises a number of substeps 112–116. In step 112, based on the present operating point of the turbine in a Q-H diagram for the given NPSH, the cavitation is classified according to type or place of cavitation, e.g., pressure-side onset edge cavitation, suction-side onset edge cavitation, surface cavitation, cavitation channel turbulence, etc. In step 114, the performance limit prescribed by the thermal overload limit of the generator, as well as the limitation of the setting unit (maximal guide vane opening), are taken into account. In step 116, the classification is further refined by taking into consideration the sand content in the medium (see FIG. 6b).

Returning to the main logic flow of FIG. 9a, the operating point of the machine is altered in step 118 based on the processed characteristic value(s) and the momentary active operating type. As illustrated in FIG. 9c, step 118 preferably comprises a number of substeps 120–128. In step 120, the regulating algorithm belonging to the momentary active operating type (performance regulation, water state regulation, turning-rate regulation, etc.) delivers the desired value for the setting signal $\Delta\gamma_{soll}$. In step 122, a sign-affected correction value $\Delta\gamma_{korr}$ is determined to result in the turbine operating point being such that the first cavitation characteristic value lies below a settable threshold value. Step 124 then adds this correction value to the setting signal by way of the summation circuit shown in FIG. 8a. In step 126, the block MIN shown in FIG. 8a performs a minimal value selection between this summed value ($\Delta\gamma_{soll}+\Delta\gamma_{korr}$), the maximum correction value ($\Delta\gamma_{korrmax}$) (if it is determined by "PowerPlus" that the system does not operate correctly), the absolute maximum gate opening value ($\Delta\gamma_{max}$) (which may be set at 100% of the mechanical limit at the expense of cavitation loss for a settable time period to activate a power reserve). This minimum value (L), is then used to change the width of the guide vane opening in step 128.

Returning again to the main logic flow of FIG. 9a, the blast-air infeed is optimized in step 130 in dependence on the cavitation state to calm turbulences or vibrations appearing in the machine. As explained above, the blast-air may be optimized either in a switched on/off manner (using the performance control branch illustrated in FIG. 7b) or in a quantitatively controlled manner (using the performance control branch illustrated in FIG. 7c).

Figure 10:
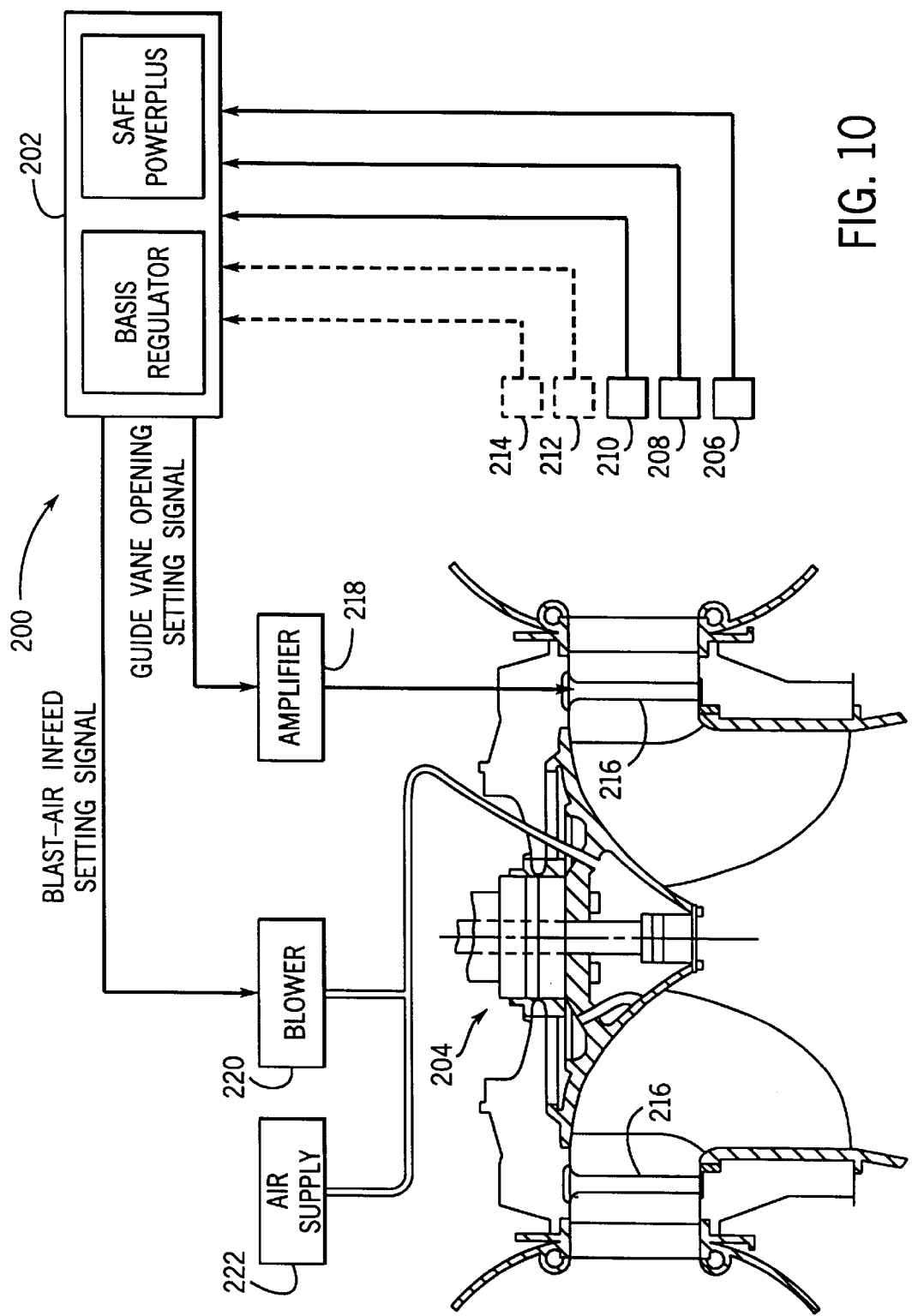
FIG. 10 shows a schematic representation of the digital turbine regulator and integrated "PowerPlus" module associated with a turbine suitable for practicing the present invention.

FIG. 10 shows a schematic representation of the "PowerPlus" system 200 including a digital turbine regulator 202 (which, as illustrated, is provided with the integrated "PowerPlus" module) associated with an exemplary turbine 204 suitable for practicing the present invention. As described above, the system also includes a plurality of sensors 206–214 for acquiring the actual operating data. In addition, turbine 204 includes a plurality of guide vanes 216 that are adjustable in position by the regulator to control the flow of water passing through the turbine. The amount of opening of guide vanes 216 is controlled by setting signals that are generated by turbine regulator 202 (and amplified by an electric amplifier 218) in accordance with the exemplary method described above. The system also includes a blower 220 and air supply 222 which are controlled by the digital regulator in the manner described above. Although the invention is illustrated in association with a Francis type turbine, as explained above the "PowerPlus" process and system can be used with all types of hydraulic flow machines and thus the invention is not limited in any way to a particular type of hydraulic turbine.

What is claimed is:

1. A process for operating a hydraulic machine, comprising the steps of:
    (A) detecting an actual machine state during operation of the machine by ascertaining operating data including
        flow through the machine,
        effective and reactive power fed into electric mains,
        guide vane opening,
        pressure upstream of the machine and at a suction pipe exit,
        headwater level, and
        tailwater level;
    (B) measuring a cavitation characteristic value indicative of cavitation manifestations, the cavitation manifestations being high-frequency sounds;
    (C) processing the cavitation characteristic value and at least one additional state characteristic value selected from the group comprising
        vibration characteristic values,
        suction pipe pressure,
        sand concentration,
        air pressure,
        water temperature, and
        generator temperature; and
    (D) altering an operating point of the machine based on the processed cavitation characteristic value and the at least one additional characteristic value to reduce cavitation and/or quiet running.

2. A process for operating a hydraulic machine, comprising the steps of:
    (A) detecting an actual machine state during operation of the machine by ascertaining operating data including
        flow through the machine,
        effective and reactive power fed into electric mains,
        guide vane opening,
        pressure upstream of the machine and at a suction pipe exit,
        head water level, and
        tail water level;
    (B) processing first and second cavitation characteristic values, the first cavitation value being a relative measure for an intensity of the cavitation load and the second cavitation characteristic value being a measure for an abrupt rise of cavitation manifestations, and at least one additional state characteristic value selected from the group comprising vibration characteristic values,
suction pipe pressure,
sand concentration,
air pressure,
water temperature, and
generator temperature; and (C) altering an operating point of the machine based on the first and second cavitation characteristic values and the at least one additional processed characteristic value to reduce cavitation and/or quiet running.

3. The process according to claim 2, wherein step (C) comprises the step of changing the width of the guide vane opening.

4. A process for operating a hydraulic machine, comprising the steps of:

(A) detecting an actual machine state during operation of the machine by ascertaining operating data including
flow through the machine,
effective and reactive power fed into electric mains,
guide vane opening,
pressure upstream of the machine and at a suction pipe exit,
head water level, and
tail water level;

(B) processing at least one state characteristic value selected from the group comprising
a first cavitation characteristic value,
a second cavitation characteristic value,
vibration characteristic values,
suction pipe pressure,
sand concentration,
air pressure,
water temperature, and
generator temperature;

(C) altering an operating point of the machine based on the at least one processed characteristic value to reduce cavitation and/or quiet running; and (D) feeding air into the machine, wherein parameters of the air infeed occur with utilization of the actual operating data and/or the state characteristic values.

5. A process for operating a hydraulic machine, comprising the steps of:

(A) detecting an actual machine state during operation of the machine by ascertaining operating data including
flow through the machine,
effective and reactive power fed into electric mains,
guide vane opening,
pressure upstream of the machine and at a suction pipe exit,
head water level, and
tail water level;

(B) processing at least one state characteristic value selected from the group comprising
a first cavitation characteristic value,
a second cavitation characteristic value,
vibration characteristic values,
suction pipe pressure,
sand concentration,
air pressure,
water temperature, and
generator temperature; and (C) altering an operating point of the machine based on the at least one processed characteristic value to reduce cavitation and/or quiet running, the altering step comprising forming a desired value for a setting signal, under consideration of a momentarily active operation type delivered from a regulating algorithm,
adding a correction value to the desired value, and
selecting a minimal value selection, wherein the setting signal is limited with adjustable opening limitation.

6. The process according to claim 5, wherein the correction value is summed up for a regulating difference at an input of a machine regulator, for the individual operating types.

7. The process according to claim 5, further comprising the steps of:

determining a type of cavitation of the machine; and
drawing parameters of regulating circuit members for the correction value based on the type of cavitation.

8. The process according to claim 2, wherein the operating point is altered for operating range optimization or for operating range extension, or for performance maximization.

9. A method for operating a hydraulic turbine, in which an operating point of the turbine is altered for the purpose of minimizing cavitation and/or quiteness in running, comprising the steps of:

(A) determining actual operating data during operation of the turbine, the data including at least the following state characteristic values
a guide vane opening,
an upper water level,
an underwater level,
a first cavitation characteristic value, which value is a relative measure for an intensity of the cavitation load,
a second cavitation characteristic value, which value is a measure for an abrupt rise of cavitation manifestations, and
air pressure;

(B) ascertaining the type of cavitation; and (C) changing the operating point in such manner that a limit for the corresponding cavitation type is not exceeded.

10. The method according to claim 9, further comprising the step of:

feeding air into the turbine during operation of the turbine, wherein parameters of the air infeed occur with utilization of the actual operating data and/or the state characteristic values.

11. The method according to claim 9, further comprising the step of determining at least one additional state characteristic value selected from the group comprising:

flow through the turbine,
effective and reactive power fed into the electric mains,
pressure upstream of the turbine,
pressure at the suction pipe exit,
total concentration,
water temperature, and
generator temperature.

12. The method according to claim 9, wherein in step (B) the cavitation type is ascertained based on a position of the operating point in a Q-H diagram for a certain net positive suction head value.

* * * * *